Patented Oct. 6, 1936

2,056,360

UNITED STATES PATENT OFFICE 2,056,360

ERGOT PREPARATION AND PROCESS OF OBTAINING SAME

Adelia McCrea, Detroit, Mich., assignor to Parke, Davis & Company, Detroit, Mich., a corporation of Michigan No Drawing. Application January 4, 1933, Serial No. 650,142

8 Claims. (Cl. 167—67)

The invention relates to the artificial production of a drug useful as a substitute for the ergot of commerce.

One of the objects of the invention is to devise a practical process for artificially developing a substance containing the characteristic properties of natural ergot.

Another object is to make available as an article of commerce a new material resembling the natural ergot in certain essential characteristics but differing from any other substance heretofore known.

A further object is to obtain a new process for manufacture of a pharmaceutical product of the ergot type without requiring any naturally grown drug.

These and other objects are obtained as a result of my research which has demonstrated for the first time that the fungus *Claviceps purpurea* develops in saprophytic culture the three chief active principles which are characteristic of the extracts made from the natural sclerotia; viz, ergotoxin, histamine, and tyramine; and that they are obtainable to an extent sufficiently large to be of economic significance.

The prior literature reveals the fact that *Claviceps purpurea* is a fungus which attacks the naturally growing rye and develops the material which is used commercially on a large scale for the manufacture of ergot extracts. The prior literature also reveals the fact that the fungus can be cultured upon certain laboratory media, but there is nothing prior to my research which has convincingly demonstrated the possibility of producing on a commercial scale an artificially prepared substance useful as a substitute for the natural ergot of commerce.

I have discovered that by properly controlling the surrounding conditions it is possible to saprophytically grow the fungus *Claviceps purpurea* and obtain a material containing the chief characteristics of the natural ergot product including the particular alkaloids ergotoxine and ergotamine. In carrying out my process it is necessary to first obtain a culture of the fungus, then preferably to develop a "single spore" strain and finally to transplant the strain on a suitable medium which will cause sufficient development to provide a final product having the desired characteristics.

The cultures of the fungus may be obtained in several ways:

1. From the ascospores (perfect stage) of germinating sclerotia.
2. From the conidia (imperfect or "sphacelial" stage, the "honeydew" of rye infection).
3. From bits of tissue taken from the inner portion of matured (but still living) sclerotia, the "ergot" of commerce.

The first two methods are of course strictly seasonal due to the fact that they depend upon the growing rye, while the last method can be used at any time when living sclerotia can be obtained. Since it is possible to secure such sclerotia alive and active in the field each summer, it will be seen that by the third method cultures of the fungus are always available.

By whatever procedure the original culture is obtained the subsequent steps of the process are the same. After isolation has given a pure culture, it is advisable to develop a "single spore" strain from which all future plantings are then made although, so far as known, *Claviceps purpurea* is homothallic. This pure, single spore strain is then grown saprophytically ("artificially") on any suitable medium either of liquid composition or of moist cereal composition, e. g. bran or ground rye. One formula that has been found to give good growth contains the following ingredients:

A  Magnesium sulphate_____grams__  0.625
   Peptone_____do____  0.625
   Dihydrogen potassium phosphate_____grams__  1.25
   Maltose_____do____  6.25
   Malt extract_____do____  6.25
   Water, distilled_____cc___  1000

Other media capable of sustaining growth of *Claviceps purpurea* are given below:

B  Magnesium sulphate_____grams__  0.5
   Dihydrogen potassium phosphate_____grams__  1.0
   Sodium chloride_____do____  0.5
   Dextrose_____do____  10.0
   Ferrous sulphate_____do____  0.01
   Gelatin_____do____  20.0
   Distilled water_____cc___  1000

C  Ammonium nitrate_____grams__  4.0
   Ammonium phosphate_____do____  0.6
   Potassium carbonate_____do____  0.6
   Magnesium sulphate_____do____  0.4
   Ferrous sulphate_____do____  0.07
   Saccharose_____do____  70.0
   Water, distilled_____cc___  1500

D  Rye bran mixed with thirty per cent distilled water in which one per cent asparagin is dissolved.

When the cereal media are used, e. g., ground rye, rye bran, etc., growth is allowed to proceed as far as possible in order that the material may be almost completely utilized by the fungus. The mass is then dried, ground if necessary, extracted and tested exactly as for crude drug.

When a liquid medium is seeded with a spore suspension of the fungus, a heavy ring of growth develops at the margin of the flasks and scattered discrete colonies form over the surface of the liquid which later join to make a mat of varying thickness according to the available nutrients and the length of time allowed for growth. At least three weeks should be given, better four, to permit full maturity but this varies somewhat with the food.

Cultures are then combined, pressed with a spatula to free from excess medium, left in petroleum ether several hours, drained on filter paper and rendered brittle by vacuum drying. This material is then ground, extracted, and tested exactly as for crude drug.

This fungus is not unduly exacting so far as physical factors are concerned. Ordinary room temperature is suitable, as it has an optimal range of 20° to 28° C., but a temperature range of from 18° to 30° C. can be employed. Outside of these ranges the results are ordinarily not as good although the organism is not completely destroyed at temperatures which are considerably outside of this range. An abundant moisture supply must be available to permit normal vegatative growth before drying checks further development. Light exerts a marked effect upon the production of color which appears to be closely associated with the production of ergosterol, but it has not appeared that this factor increases the content or activity of alkaloids. Ample aeration is a requisite for good growth. Oxygenation is a very definite stimulation to more rapid metabolism and increased growth, provided that other factors are kept at optimal conditions. The time necessary for securing what may be termed nature mycelial mats corresponds approximately to the period of growth in rye heads under natural conditions, i. e., about a month from date of inoculation.

When properly isolated and grown under suitable conditions, this saprophytic fungus growth develops the characteristic active principles, i. e., the alkaloid constituents of ergot sclerotia grown naturally as a parasite of rye. This has been repeatedly shown by tests that conform strictly to the methods of the U. S. P. X. Extracts of this material, therefore, exhibit the physiological activity and medicinal value of extracts made from the crude drug sclerotia, the "ergot" of commerce.

The mycelial mats hereinbefore described are not identical with natural ergot of commerce. One difference is that the mycelia of saprophytically grown *Claviceps purpurea* when germinated pass through the conidial (non-sexual) stage but do not pass through the ascospore (sexual) stage and consequently do not develop sclerotia. Thus the mycelial mats obtained by my invention not only differ from natural ergot in physical form and appearance but also possess a real biological difference. My new product may be designated as non-sclerotial mycelium of saprophytically grown *Claviceps purpurea*.

What I claim as my invention is:

1. The process of obtaining a drug useful for the manufacture of ergot preparations comprising the inoculation of a cereal culture medium containing abundant moisture supply with a culture of *Claviceps purpurea*, maintaining said culture medium at a temperature of 20° to 28° C. for a period of at least three or four weeks, drying the cereal medium and comminuting to obtain a series of particles adapted for extraction.

2. The process of manufacturing a pharmaceutical preparation comprising the placing of a cereal composition in a suitable container, said cereal mixture having an abundant supply of water, inoculating said cereal composition with a pure culture of *Claviceps purpurea*, maintaining said culture at a temperature of 20° to 28° C. for a time not less than three weeks, removing the mass from the container, drying, comminuting and extracting the comminuted material to obtain a product having physiological properties characteristic of ergot.

3. The process of obtaining a product having the physiological properties characteristic of natural ergot comprising the inoculation with *Claviceps purpurea* of a culture medium comprising magnesium sulphate, peptone, dihydrogen potassium phosphate, maltose, malt extract, and water, continuing the incubation at a temperature of 20° to 28° C. until said culture medium is substantially utilized by the said fungus, drying and comminuting the resulting mass, and extracting the same to obtain a product having the alkaloids and the physiological properties characteristic of natural ergot.

4. The process of obtaining a product having the physiological properties characteristic of natural ergot comprising the inoculation of a culture medium having an abundant moisture supply with *Claviceps purpurea*, maintaining said culture medium at a temperature within the range substantially from 18° C. to 30° C. for a period of time on the order of three weeks or more sufficient to develop a mycelial mat and extracting said mycelial mat to obtain a product having physiological properties characteristic of extracts of natural ergot.

5. The process of obtaining a drug useful in the manufacture of ergot preparations comprising the inoculation of a cereal culture medium containing an abundant moisture supply with *Claviceps purpurea*, maintaining said culture medium at a temperature within the range substantially from 18° C. to 30° C. for a period of time on the order of three weeks or more sufficient to develop a mycelial mat containing alkaloids having physiological properties characteristic of the alkaloids of natural ergot, removing said mycelial mats and drying the same.

6. A drug comprising a saprophytic growth of *Claviceps purpurea*, being in the form of a dried mycelial mat containing in extractable form alkaloids having the physiological characteristics of ergotoxin and ergotamine, said mycelial mat being a vegetative growth free from sclerotia.

7. A drug comprising a saprophytic growth of *Claviceps purpurea* containing extractable alkaloids having physiological properties characteristic of the alkaloids of natural ergot, said growth being vegetative and free from sclerotia.

8. The process of obtaining a product having the physiological properties characteristic of natural ergot comprising the inoculation of a culture medium having an abundant moisture supply with *Claviceps purpurea*, maintaining said culture medium at a temperature within the range substantially from 18° C. to 30° C. for a period of time sufficient to develop a mycelial mat and extracting said mycelial mat to obtain a product having physiological properties characteristic of extracts of natural ergot.

ADELIA McCREA.